(12) United States Patent
Kim

(10) Patent No.: US 7,403,244 B2
(45) Date of Patent: Jul. 22, 2008

(54) LIQUID CRYSTAL DISPLAY DEVICE WHEREIN CASE TOP ADHERED SUPPORTER BEING IN CONTACT WITH PRINTED CIRCUIT BOARD

(75) Inventor: Hyun Ok Kim, Busan (KR)

(73) Assignee: LG Display Co., Ltd., Seoul (KR)

( * ) Notice: Subject to any disclaimer, the term of this patent is extended or adjusted under 35 U.S.C. 154(b) by 599 days.

(21) Appl. No.: 11/138,687

(22) Filed: May 27, 2005

(65) Prior Publication Data

US 2005/0264713 A1 Dec. 1, 2005

(30) Foreign Application Priority Data

May 31, 2004 (KR) .................. 10-2004-0038890

(51) Int. Cl.
*G02F 1/1333* (2006.01)
*G02F 1/1345* (2006.01)

(52) U.S. Cl. .................. 349/58; 349/149; 349/151

(58) Field of Classification Search ............ 349/58, 349/149–152
See application file for complete search history.

(56) References Cited

U.S. PATENT DOCUMENTS

| | | | |
|---|---|---|---|
| 6,847,417 B2 * | 1/2005 | Kim ........................... 349/58 |
| 2004/0233372 A1 * | 11/2004 | Park .......................... 349/149 |
| 2004/0264211 A1 * | 12/2004 | Han et al. ................... 362/561 |
| 2007/0030420 A1 * | 2/2007 | Jang ........................... 349/96 |

* cited by examiner

*Primary Examiner*—Mike Qi
(74) *Attorney, Agent, or Firm*—McKenna, Long & Aldridge LLP

(57) ABSTRACT

Disclosed is a liquid crystal display device that is adaptive for simplifying its manufacturing process and reducing its cost. A liquid crystal display device according to an embodiment of the present invention includes a liquid crystal display panel on which a printed circuit board is mounted; a case top that covers an edge of the liquid crystal display panel; and a supporter adhered to the case top and being in contact with the printed circuit board.

11 Claims, 5 Drawing Sheets

US 7,403,244 B2

LIQUID CRYSTAL DISPLAY DEVICE WHEREIN CASE TOP ADHERED SUPPORTER BEING IN CONTACT WITH PRINTED CIRCUIT BOARD

This application claims the benefit of Korean Patent Application No. P2004-38890 filed on May 31, 2004, which is hereby incorporated by reference for all purposes as if fully set forth herein.

BACKGROUND OF THE INVENTION

1. Field of the Invention

The present invention relates to a liquid crystal display device and a display device, and more particularly to a liquid crystal display device and a display device that are adaptive for simplifying its manufacturing process and reducing its cost.

2. Discussion of the Related Art

Generally, a liquid crystal display (LCD) device is a representative display of flat panel displays. The LCD displays a picture by controlling an amount of light in correspondence to a video signal. Because it has such advantages as lightness, thinness, low power consumption and so on, the LCD is in a trend to broaden the range of its application. According to this trend, the LCD is widely used as a display device for notebook computers and office automation equipment. Further, the LCD is in a trend toward large-sized screen, high precision and low power consumption.

FIG. 1 illustrates an assembly diagram of a liquid crystal display (LCD) device according to the related art. Referring to FIG. 1, the LCD device includes a liquid crystal display panel 2; a backlight unit to irradiate light to the LCD panel; a support main 16 to house the LCD panel 2 and the backlight unit; a cover bottom 20 combined with one side of the support main 16 to fix the backlight unit and to support the support main 16; a guide panel 4 arranged between the backlight unit and the LCD panel 2 to support the LCD panel 2 and to be combined with the side surfaces of the support main 16; and a case top 6 covering the side walls of the guide panel 4 and the edges of the LCD panel 2.

The LCD panel 2 includes a plurality of liquid crystal cells arranged in a matrix configuration between upper and lower glass substrates and a thin film transistor at each of the liquid crystal cells to switch a video signal. The refractive index of each of the liquid crystal cells changes in accordance with the video signal, thus a picture corresponding to the video signal can be displayed. A tape carrier package (not shown) is attached to the lower substrate of the LCD panel 2, wherein a driver integrated circuit is mounted on the tape carrier package to apply a drive signal to a thin film transistor. Further, polarizing sheets 8 and 18 are attached to the front and rear surfaces of the LCD panel 2. The polarizing sheets 8 and 18 may have an additional function of improving the viewing angle of the LCD device.

The backlight unit includes a lamp 36, which receives electric power from an external power source, to irradiate light to the LCD panel 2; a light guide panel 12 to direct the incident light from a light-incoming part, which is formed at the side surface facing the lamp 36, toward the LCD panel 2; a lamp housing 34 to cover the lamp 36 and the light-incoming part of the light guide panel 12; a reflection sheet 14 arranged at the rear surface of the light guide panel 12; and a plurality of optical sheets 10 to improve the efficiency of the light traveling to the LCD panel 2.

The lamp 36 includes a high voltage electrode and a low voltage electrode which are formed at both ends of a glass tube; a high voltage wire 44 connected to the high voltage electrode by soldering; and a low voltage wire 42 connected to the low voltage electrode. The high and low voltage electrodes soldered with the wires 42 and 44 are covered with an insulating holder. Further, the high and low voltage wires 44 and 42 are connected to outside of the LCD device, for example, to a connector 40 through a wire fixation part 60 formed at the guide panel 4.

The lamp housing 34 increases the efficiency of the light that is irradiated from the lamp 36 by minimizing light loss. The light guide panel 12 has a fixed tilt angle and guides the light incident from the lamp 36 to the LCD panel 2. The reflection sheet 14 directs the light generated from the lamp 36 to the light guide panel 12 to minimize light loss. The optical sheets 10 causes the inclined incident light from the surface of the light guide panel 12 and the reflection sheet 14 to vertically travel toward the LCD panel 2.

The guide panel 4 is bent in an 'L' shape and placed on the upper surfaces of the edges of the support main 16, and it covers the side surfaces of the support main 16. The guide panel 4 has a receiving part for receiving the rear surface of the LCD panel 2 and side walls for guarding the side surfaces of the LCD panel to support the LCD panel 2.

As illustrated in FIG. 2, the case top 6 formed in a square belt shape has a plane part 6a and a side surface part 6b that are orthogonally bent, so as to cover the edges of the LCD panel 2 and the side surfaces of the support main 16.

The support main 16, which is a mold of plastic material, has the side wall surfaces. The inside of the side wall surfaces includes a step portion in which the backlight unit, the guide panel 4 and the LCD panel 2 are stacked together. Also, the one side of the support main 16 to which the backlight unit is inserted is combined with the cover bottom 20.

The cover bottom 20 protects the backlight unit and supports the support main 16. The cover bottom 20 is formed of a metal material to reinforce the hardness of the support main 16 which is formed of a plastic material.

An assembly process of the related art LCD device will be described hereafter. First, the one side of the support main 16 is combined with the cover bottom 20 using screws. And then, the reflection sheet 14 is provided on the front surface of the combined support main 16 and the cover bottom 20, and the lamp housing 34 where the lamp 36 and the light guide panel 12 are combined is inserted into a space which is formed by one side of the support main 16 and the cover bottom 20. The optical sheets 10 are provided on the light guide panel 12. After completion of receiving the backlight unit, the LCD panel 2 in which the polarizing sheets 8 and 18 are adhered onto the upper and lower surfaces thereof is assembled.

Next, the case top 6, which covers the edges of the LCD panel 2 and the side walls of the support main 16, is combined. In the one side of the support main 16 combined with the cover bottom 20, a combining part formed at one side of the cover bottom 20 is combined with a hook combining part formed at one side of the case top 6.

The case top 6 includes its plane part 6a and a plurality of supporters 7 projected in a direction of the LCD panel, as illustrated in FIG. 2. The supporters 7 are in contact with a gate PCB 30 or a data PCB of the LCD panel 2, thereby maintaining a gap between the case top 6 and driver integrated circuits 35 mounted on tape carrier packages 32 (TCP). Further, the supporters 7 are in contact with the gate PCB 30, the guide panel 4 and other parts so as to fix the other parts or to support the parts during the screw placement.

However, the supporters 7 according to the related art are integrated with the case top 6. Accordingly, when the shape of the parts becomes complicated or their design changes are required, the case top 6 should be wholly redesigned and reproduced to accommodate the design changes in the supports 7. Reproducing a new case top requires a new die for casting and other processes, thereby complicating the manufacturing process and increasing the production cost.

SUMMARY OF THE INVENTION

Accordingly, the present invention is directed to a liquid crystal display device and a display device that substantially obviate one or more of the problems due to limitations and disadvantages of the related art.

An advantage of the present invention is to provide a liquid crystal display device that is adaptive for simplifying its manufacturing process and reducing its production cost.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal display panel to which a printed circuit board is mounted; a case top that covers an edge of the liquid crystal display panel; and a supporter adhered to the case top and being in contact with the printed circuit board.

In the liquid crystal display device, the supporter includes a conductive material.

In the liquid crystal display device, the supporter is adhered to the case top using either a double sided tape or a conductive adhesive.

In the liquid crystal display device, a copper film treatment is performed on an area of the printed circuit board where the supporter contacts the printed circuit board.

In the liquid crystal display device, the printed circuit board is electrically connected to the case top through the supporter.

In another aspect of the present invention, a display device includes a display panel for displaying images; a printed circuit board (PCB) coupled to the display panel for driving the display panel; a case top covering an edge of the display panel; and a supporter attached to the case top using a connector and being in contact with the PCB.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
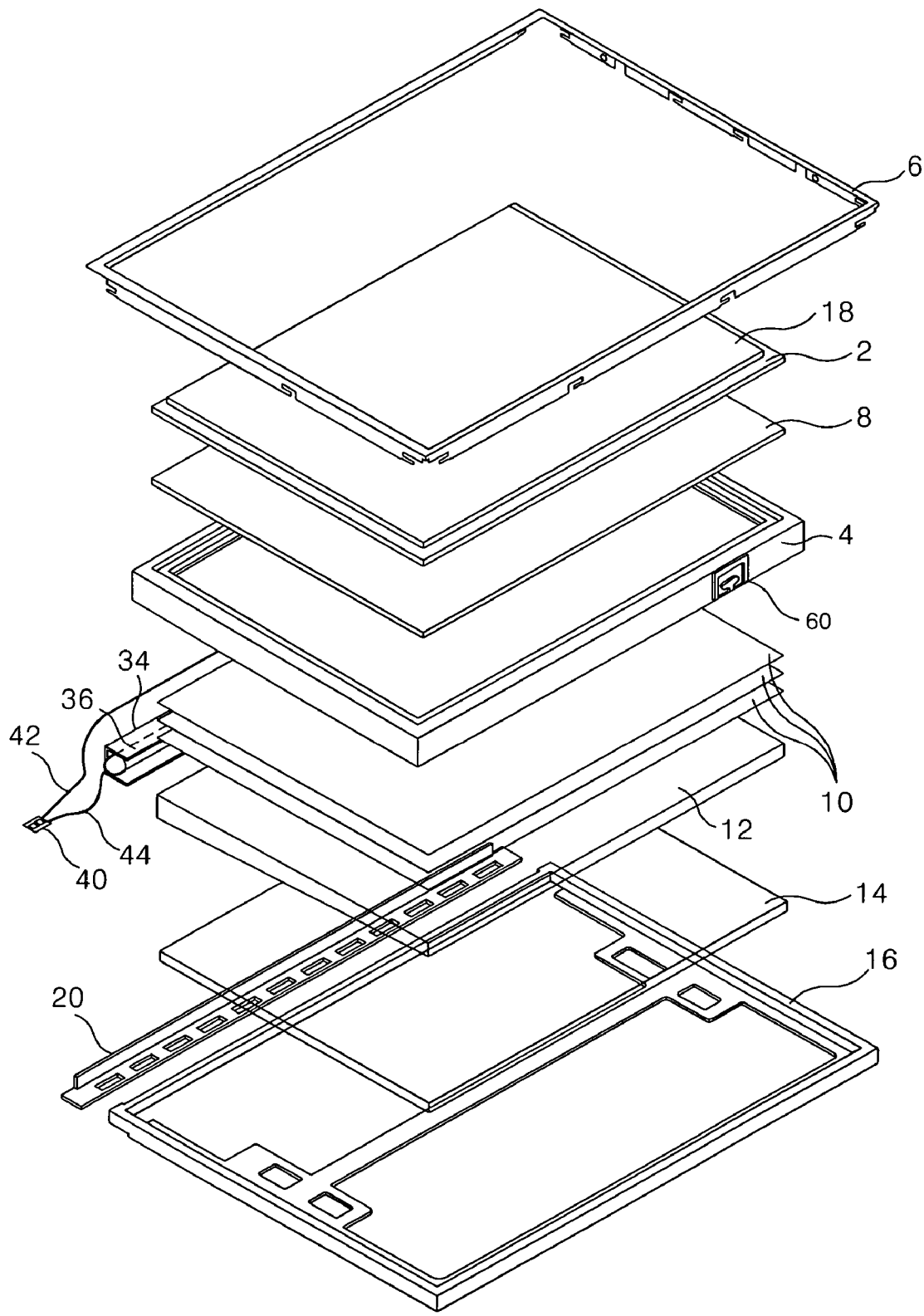
FIG. 1 illustrates an assembly of a liquid crystal display device according to the related art.
Figure 2:
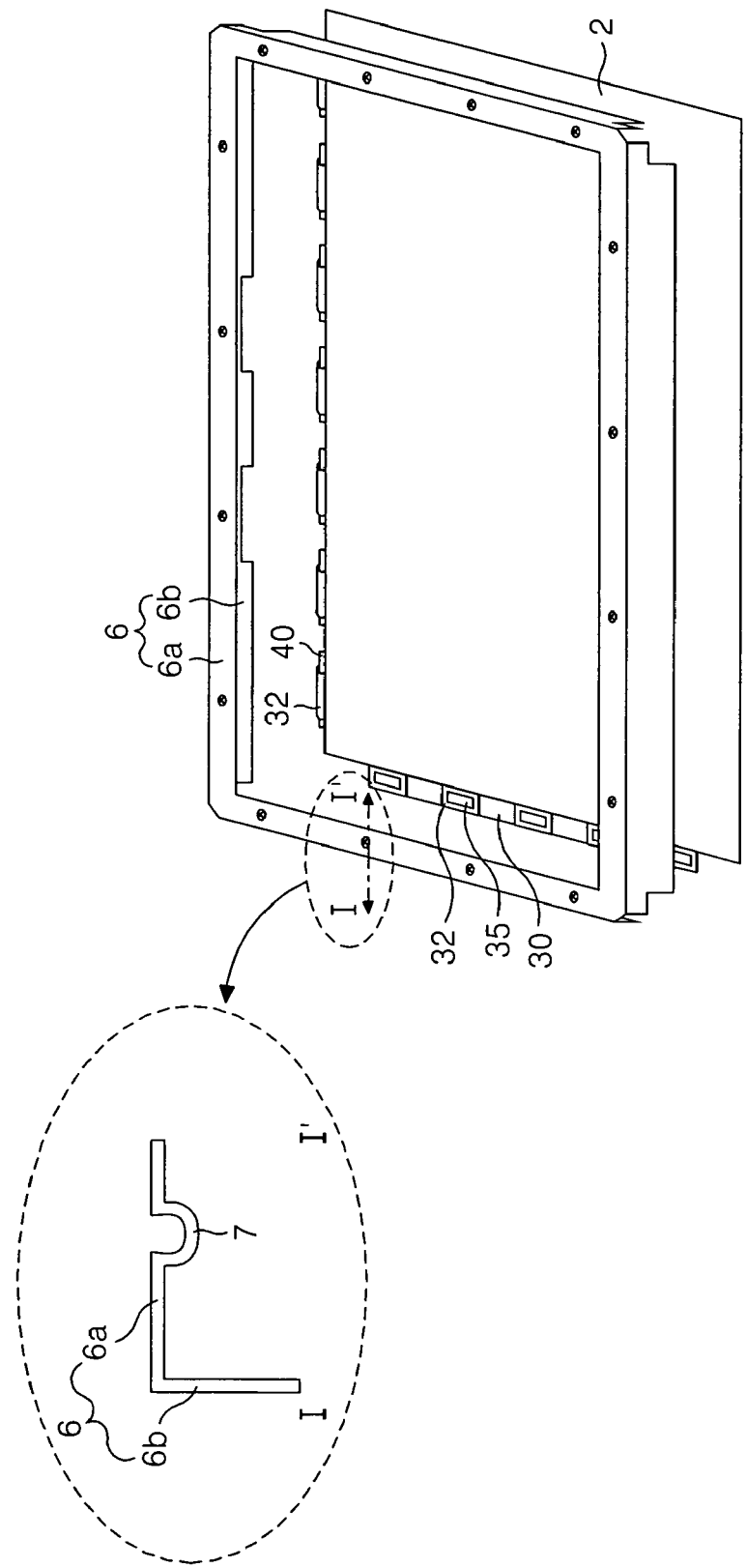
FIG. 2 is a detailed view illustrating a case top and a liquid crystal display panel according to the related art.
Figure 3:
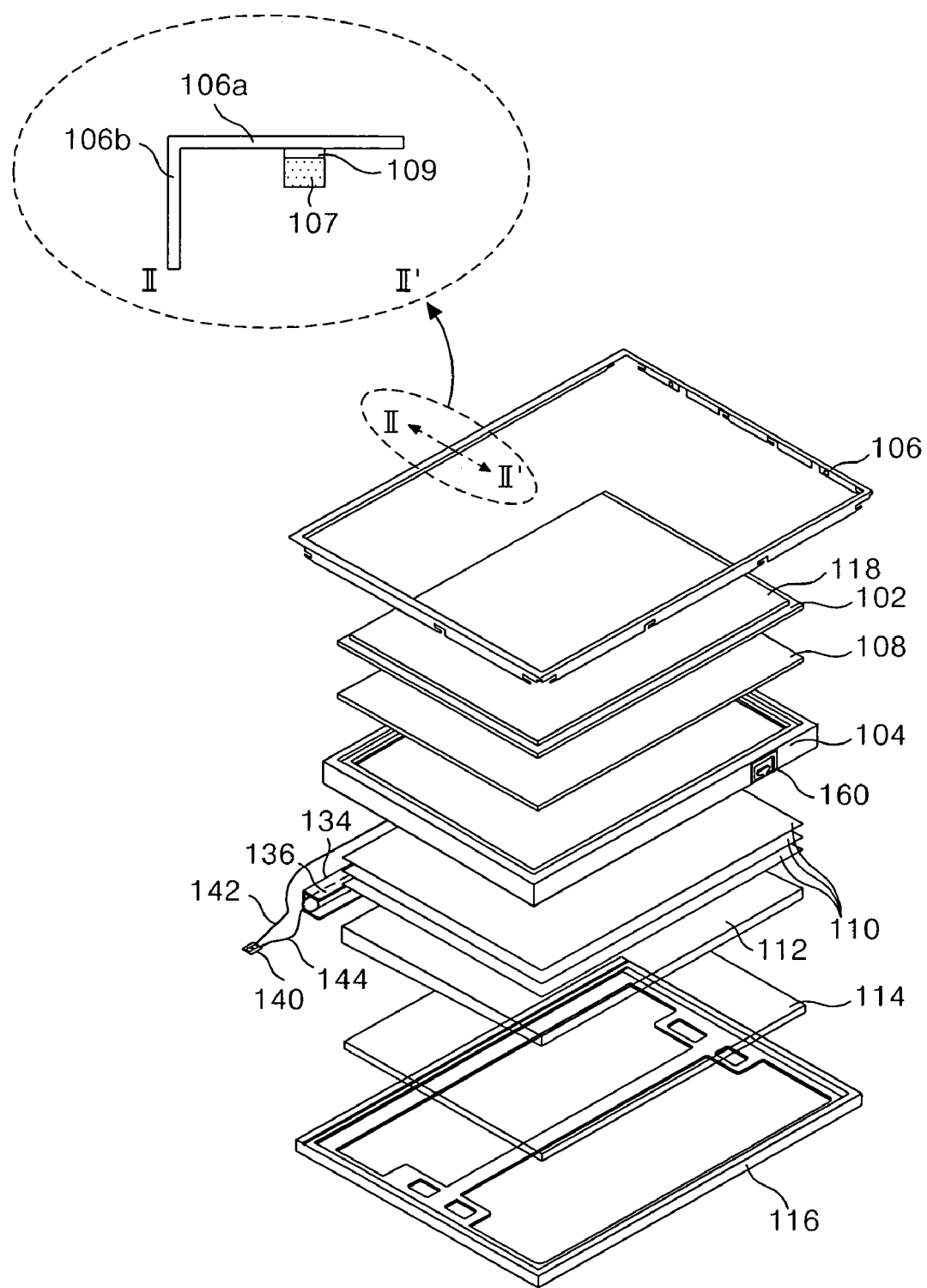
FIG. 3 illustrates an assembly of a liquid crystal display device according to the present invention.

FIG. 3 illustrates an assembly diagram of a liquid crystal display (LCD) device according to an embodiment of the present invention. Referring to FIG. 3, the LCD device includes a liquid crystal display panel 102; a backlight unit to irradiate light to the LCD panel 102; a support main 116 to house the LCD panel 102 and the backlight unit; a cover bottom (not shown) combined with one side of the support main 116 to fix the backlight unit and to support the support main 116; a guide panel 104 arranged between the backlight unit and the LCD panel 102 to support the LCD panel 102 and to be combined the side surfaces of the support main 116; and a case top 106 covering the side walls of the guide panel 104 and the edges of the LCD panel 102.

The LCD panel 102 includes a plurality of liquid crystal cells arranged in a matrix configuration between upper and lower glass substrates and a thin film transistor at each of the liquid crystal cells to switch a video signal. The refractive index of each of the liquid crystal cells changes in accordance with the video signal, thus a picture corresponding to the video signal can be displayed. A tape carrier package (not shown) is attached to the lower substrate of the LCD panel 102, wherein a driver integrated circuit is mounted on the tape carrier package to apply a drive signal to a thin film transistor. Further, polarizing sheets 108 and 118 are attached to the front and rear surfaces of the LCD panel 102. The polarizing sheets 108 and 118 may have an additional function of improving the viewing angle of the LCD device.

The backlight unit includes a lamp 136 which receives electric power from an external power source, to irradiate light to the LCD panel 102; a light guide panel 112 to direct the incident light from a light-incoming part, which is formed at the side surface facing the lamp 136, toward the LCD panel 102; a lamp housing 134 to cover the lamp 136 and the light-incoming part of the liquid guide panel 112; a reflection sheet 114 arranged at the rear surface of the light guide panel 112; and a plurality of optical sheets 110 to improve the efficiency of the light traveling to the LCD panel 102.

The lamp 136 includes a high voltage electrode and a low voltage electrode which are formed at both ends of a glass tube; a high voltage wire 144 connected to the high voltage electrode by soldering; and a low voltage wire 142 connected to the low voltage electrode. The high and low voltage electrodes soldered with the wires 142 and 144 are covered with an insulating holder. Further, the high and low voltage wire 144 and 142 are connected to outside of the LCD device, for example, to a connector 140 through a wire fixation part 160 formed at the guide panel 104.

The lamp housing 134 increases the efficiency of the light that is irradiated from the lamp 136 by minimizing light loss. The light guide panel 112 has a fixed tilt angle and guides the light incident from the lamp 136 to the LCD panel 102. The reflection sheet 114 directs the light generated from the lamp 136 to the light guide panel 112 to minimize light loss. The optical sheets 110 causes the inclined incident light from the surface of the light guide panel 112 and the reflection sheet 114 to vertically travel toward the LCD panel 102.

The guide panel 104 is bent in an 'L' shape and placed on the upper surfaces of the edges of the support main 116, and it covers the side surfaces of the support main 116. The guide panel 104 has a receiving part for receiving the rear surface of the LCD panel 102 and side walls for guarding the side surfaces of the LCD panel 102 to support the LCD panel 102.

The support main 116, which is a mold of plastic material, has the side wall surfaces. The inside of the side wall surfaces includes a step portion in which the backlight unit, the guide panel 104 and the LCD panel 102 are stacked together. Also, the one side of the support main 116 to which the backlight unit is inserted is combined with the cover bottom (not shown).

The cover bottom protects the backlight unit and supports the support main 116. The cover bottom is formed of a metal material to reinforce the hardness of the support main 116 which is formed of a plastic material.

As illustrated in FIG. 3, the case top 106 formed in a square belt shape has a plane part 106a and a side surface part 106b that are orthogonally bent, so as to cover the edges of the LCD panel 102 and the side surfaces of the support main 116.

According to the embodiment of the present invention, the case top 106 includes a supporter 107 which is adhered to the plane part 106a of the case top 106 using an adhesive 109. That is, the supporter 107 is separately manufactured to conform with the shape of a complicated part, a design change and a new shape, without being integrally formed with the case top 106. Then, the supporter 107 is adhered to the case top 106 using the adhesive 109 such as a conductive tape, an aluminum tape, or the like. Accordingly, the manufacturing process of an LCD device becomes simplified and its production cost becomes reduced, as compared with the related art.

Figure 4:
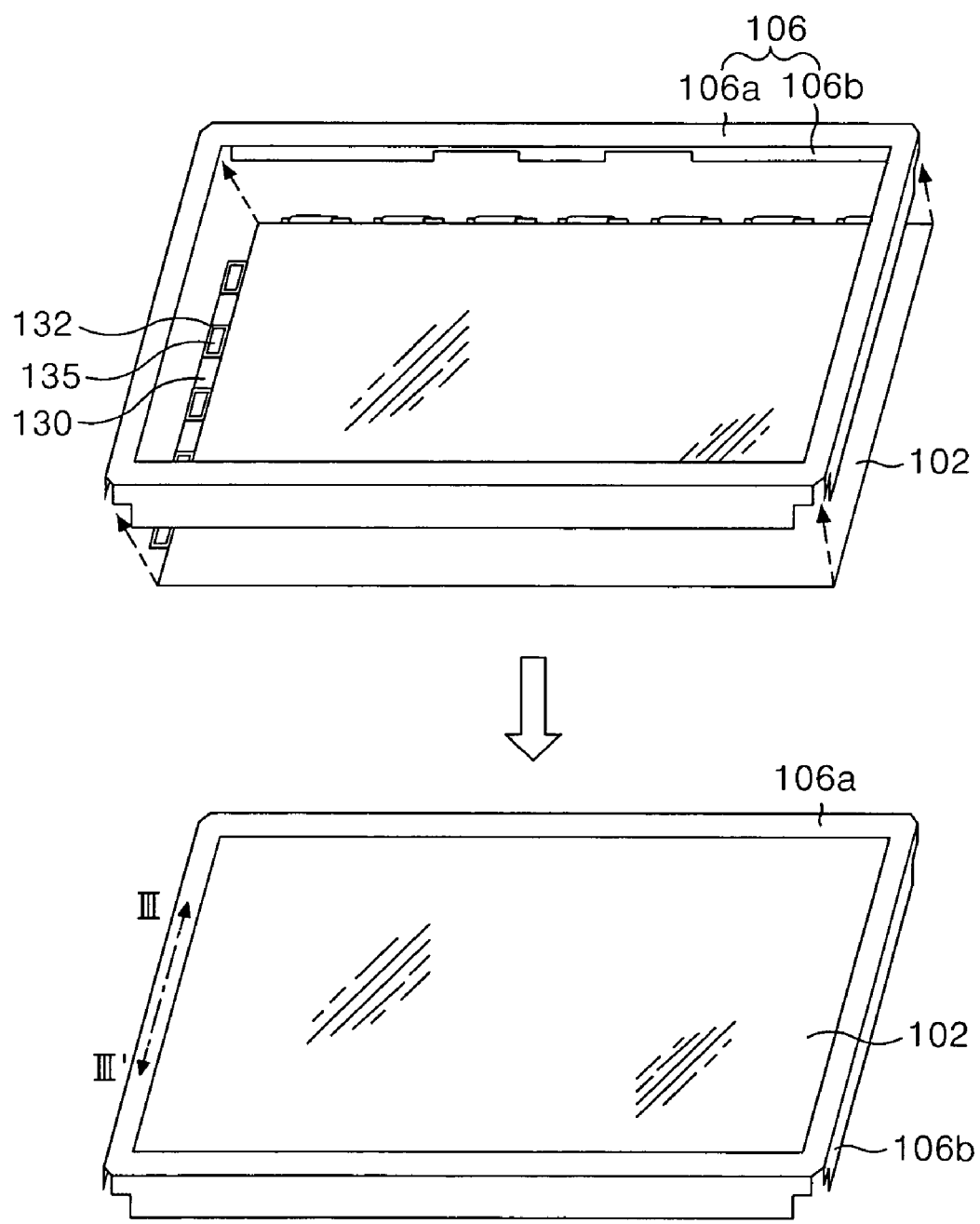
FIG. 4 illustrates an assembly of a liquid crystal display panel and a case top according to an embodiment of the present invention.
Figure 5:
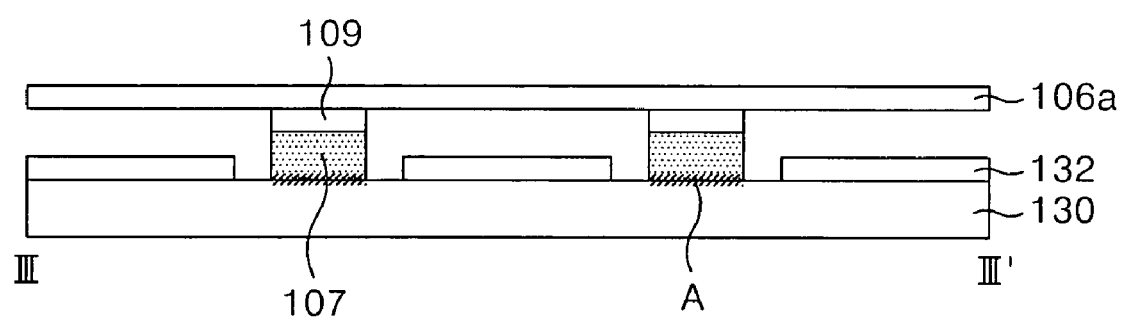
FIG. 5 is a cross-sectional view taken along the line III-III' of FIG. 4.

FIG. 4 illustrates an assembly of a liquid crystal display panel and a case top according to an embodiment of the present invention, and FIG. 5 is a cross-sectional view taken along the line III-III' of FIG. 4.

Referring to FIGS. 4 and 5, the case tope 106 having the supporter 107, which is separately manufactured, is combined with the LCD panel 102 having the polarizing sheets 118 and 108 adhered onto the upper and lower surfaces. At this time, the case top 106 covers the edges of the LCD panel 102 and the side walls of the support main (not shown), and the supporter 107 is provided on a upper part of the liquid crystal display panel 102 where a gate PCB 30 or a data PCB (not shown) is installed.

As illustrated in FIG. 5, the supporter 107 is in contact with the gate PCB 130 or the data PCB (not shown) of the LCD panel 102, thereby maintaining a gap between the case top 106 and the driver integrated circuit 135 mounted on the TCP 132. Further, the supporter 107 is in contact with the gate PCB 130, the guide panel 104 and other parts so as to fix the other parts or to support the parts during the screw placement.

The supporter 107 is formed of a conductive metal such as aluminum (Al), chrome (Cr) or the like. When a copper film treatment is performed on the area of the gate PCB 130 that is in contact with the supporter 107, the supporter 107 and the case top 106 can serve as a ground source GND.

As described above, the case top 106 of the LCD device according to the present invention includes the supporter 107 adhered to the plane part 106a using the adhesive 109, which is separately manufactured. Accordingly, even when a design change of the supporter 107 is required, reproducing a wholly new case top is not necessary, thereby simplifying the manufacturing process and reducing the production cost.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a liquid crystal display panel to which a printed circuit board is mounted;
    a case top that covers an edge of the liquid crystal display panel; and
    a supporter adhered to the case top and being in contact with the printed circuit board.

2. The liquid crystal display device according to claim 1, wherein the supporter includes a conductive material.

3. The liquid crystal display device according to claim 1, wherein the supporter is adhered to the case top using either a double sided tape or a conductive adhesive.

4. The liquid crystal display device according to claim 1, wherein a copper film treatment is performed on an area of the printed circuit board where the supporter contacts the printed circuit board.

5. The liquid crystal display device according to claim 4, wherein the printed circuit board is electrically connected to the case top through the supporter.

6. A display device, comprising:
    a display panel for displaying images;
    a printed circuit board (PCB) coupled to the display panel for driving the display panel;
    a case top covering an edge of the display panel; and
    a supporter attached to the case top using a connector and being in contact with the PCB.

7. The display device according to claim 6, wherein the supporter includes a conductive material.

8. The display device according to claim 6, wherein the connector is either a double sided tape or a conductive adhesive.

9. The display device according to claim 6, wherein the connector is a screw.

10. The display device according to claim 6, wherein a copper film treatment is performed on an area of the PCB where the supporter contacts the PCB.

11. The display device according to claim 10, wherein the PCB is electrically connected to the case top through the supporter.

* * * * *